US006702354B2

(12) United States Patent
Galijasevic

(10) Patent No.: US 6,702,354 B2
(45) Date of Patent: Mar. 9, 2004

(54) RECEPTACLE ASSEMBLY WITH A CASE PIVOTALLY MOUNTED IN A HOUSING SHELL

(75) Inventor: Sasa Galijasevic, Kaiserslautern (DE)

(73) Assignee: TRW Automotive Electronics & Components GmbH & Co., KG, Enkenbach-Alsenborn (DE)

( * ) Notice: Subject to any disclaimer, the term of this patent is extended or adjusted under 35 U.S.C. 154(b) by 0 days.

(21) Appl. No.: 10/262,020

(22) Filed: Oct. 1, 2002

(65) Prior Publication Data

US 2003/0075944 A1 Apr. 24, 2003

(30) Foreign Application Priority Data

Oct. 2, 2001 (DE) .................................... 201 16 159 U

(51) Int. Cl.[7] .................................................. B60R 7/00
(52) U.S. Cl. ................... 296/37.1; 296/37.9; 296/37.12
(58) Field of Search ............................ 296/37.9, 37.12, 296/37.8, 37.13, 37.1; 292/DIG. 22, 230

(56) References Cited

U.S. PATENT DOCUMENTS

| | | | | |
|---|---|---|---|---|
| 5,052,728 A | | 10/1991 | Fukumoto | 292/106 |
| 5,386,636 A | * | 2/1995 | Asano | 296/37.12 |
| 5,603,540 A | * | 2/1997 | Shibao | 292/DIG. 22 |
| 6,213,533 B1 | | 4/2001 | Widulle et al. | 296/37.12 |

FOREIGN PATENT DOCUMENTS

| | | | |
|---|---|---|---|
| DE | 1977331 | U | 1/1968 |
| DE | 7206013 | U | 5/1972 |
| DE | 41 30 847 | A1 | 3/1993 |
| DE | 44 27 768 | C1 | 11/1995 |
| DE | 4221246 | C2 | 5/2000 |
| EP | 0 894 662 | A2 | 2/1999 |
| FR | 2579181 | | 3/1985 |

* cited by examiner

*Primary Examiner*—Dennis H. Pedder
(74) *Attorney, Agent, or Firm*—Tarolli, Sundheim, Covell & Tummino L.L.P.

(57) ABSTRACT

A receptacle assembly for mounting in a vehicle is disclosed. The assembly includes a housing shell (12), a case (18) that is pivotally mounted in the shell to be movable between an open position and a closed position, a spring biasing the case to the open position and a latching mechanism for latching the case in the closed position. The latching mechanism releases the case from the closed position under the action of a push onto the case against the force of the spring moving the case to a pushed position. The assembly further includes a blocking device with a blocking body (22) that is spring biased to a normal rest position and movable under inertial forces to an active blocking position. The blocking body (22), in the normal rest position, permits free pivotal movement of the case (18) and, in the blocking position, blocks movement of the case from the closed to the pushed position, thereby preventing the case from accidentally pivoting to the open position.

2 Claims, 2 Drawing Sheets

RECEPTACLE ASSEMBLY WITH A CASE PIVOTALLY MOUNTED IN A HOUSING SHELL

FIELD OF THE INVENTION

The present invention relates to a receptacle assembly including a housing shell, a case that is pivotally mounted in the shell to be movable between an open position and a closed position, a spring biasing the case to the open position and a latching mechanism for latching the case in the closed position, the latching mechanism releasing the case from the closed position under the action of a push onto the case against the force of the spring moving the case to a pushed position.

Examples of such a case are ashtrays, coin holders and glove compartments in vehicles. In order to move the case out of the open position to the closed position, an upper edge of the case is pushed until the closed position has been reached. A latch mechanism ensures that the case is maintained in the closed position. In order to move to the open position, the case is pushed again, as a result of which it is unlatched and moved automatically to the open position under the action of the spring.

BACKGROUND OF THE INVENTION

In order to prevent accidental unlatching of the case with subsequent movement into the open position, under the action of inertial forces, for example, it is known from DE 44 27 768 C1 to mount a spring-stressed weight so that it can be slid onto a locking lever that interacts with the latching mechanism, the weight being movable into a deflected position in which it interacts with a stop on the shell in order to block the locking lever. As a result, however, the already complicated latching mechanism becomes even more complex.

SUMMARY OF THE INVENTION

The invention provides a receptacle assembly that uses very simple means to prevent unlatching of the case under the influence of inertial forces. Specifically, the inventive assembly includes a housing shell, a case that is pivotally mounted in the shell to be movable between an open position and a closed position, a spring biasing the case to the open position and a latching mechanism for latching the case in the closed position. The latching mechanism releases the case from the closed position under the action of a push onto the case against the force of the spring moving the case to a pushed position. The assembly further includes a blocking device with a blocking body that is spring biased to a normal rest position and movable under inertial forces to an active blocking position. The blocking body, in the normal rest position, permits free pivotal movement of the case and, in the blocking position, obstructs movement of the case from the closed to the pushed position, thereby preventing the case from being unlatched and accidentally pivoting to the open position.

In the preferred embodiment, the blocking device includes an engagement member attached to one of the case and the housing shell, the blocking body being movably mounted on the other of said case and housing shell. The blocking body has a notch and the engagement member has a projection. The projection fits into the notch when the blocking member is in the normal rest position and the case is in the pushed position, but the projection on the notch of the engagement member abuts the blocking body when the blocking body is in the active blocking position and the case moves from the closed position towards the pushed position. In this embodiment, the blocking device is reduced to just a few components that are easily produced by injection molding of plastics.

SHORT DESCRIPTION OF DRAWINGS

Further features and advantages of the invention ensue from the description below of an embodiment and from the drawing to which reference is made. In the drawings.

DETAILED DESCRIPTION OF PREFERRED EMBODIMENT

Figure 1:
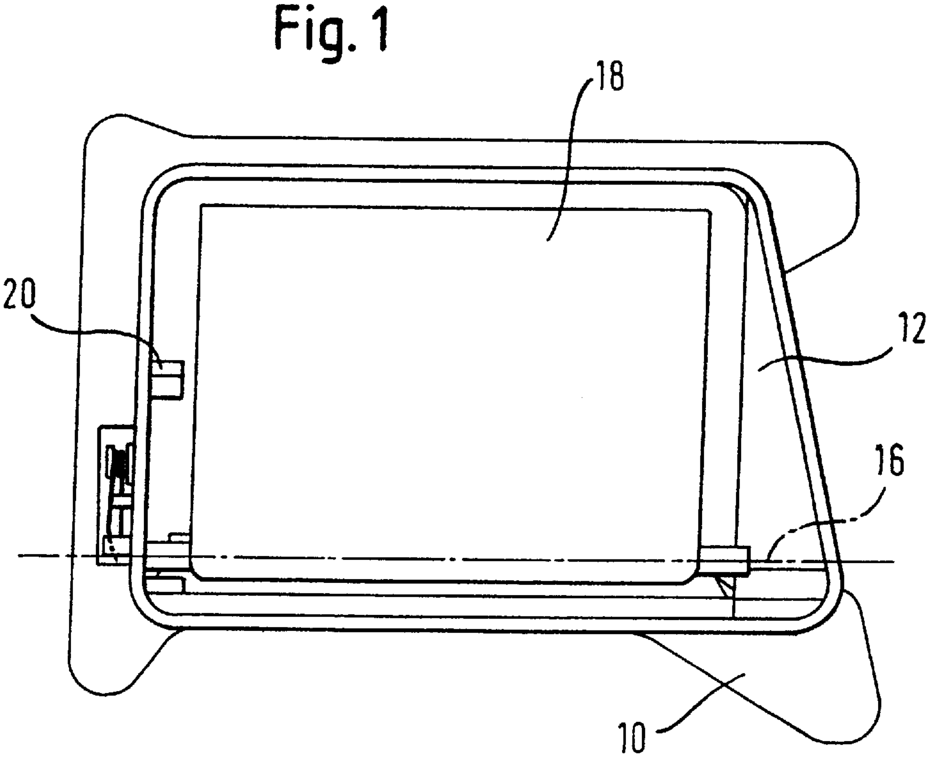
FIG. 1 is a schematic front view of a receptacle assembly with a housing shell and a case pivotally mounted in the shell.
Figure 3:
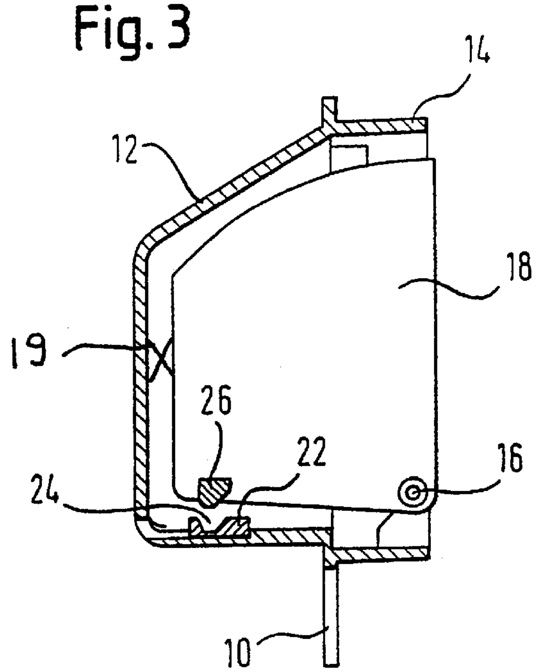
FIG. 3 is a schematic sectional view of the assembly where the case is shown in a closed position.

The embodiment shown in the drawings is an ashtray assembly for installation into a vehicle door. The ashtray assembly has a flange-like frame 10, a trough-like housing shell 12 and a collar 14 that projects away from the flange on the side opposite from the housing shell 12. In the housing shell, a case 18 is pivotally mounted on an axis 16. As usual, the case 18 is a cup-shaped component that is open at the top. The case 18 is biased by an actuation spring (schematically illustrated at 19) into its open position in which it is largely pivoted out of the housing shell. A latching mechanism 20, only shown schematically in FIG. 1, maintains the case 18 in the closed position shown in FIG. 3. Case 18 is unlatched and released from the closed position by pushing against its upper section to be pivoted into a pushed position. Unlatched, the case 18 swings to the open position under the action of the actuation spring.

Figure 2:
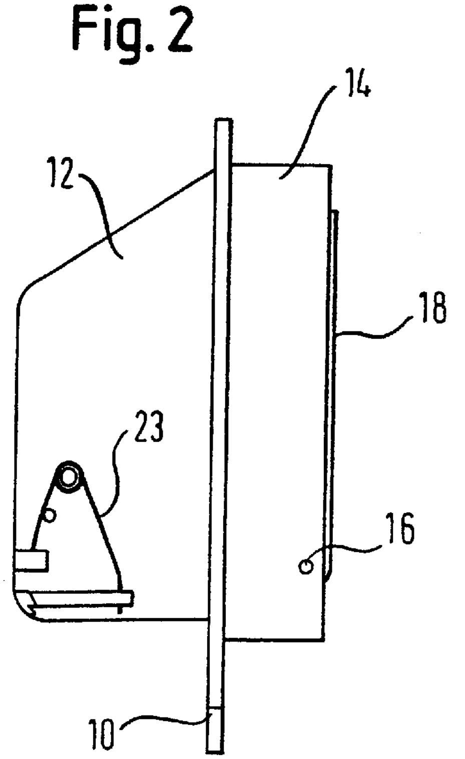
FIG. 2 is a schematic side view of the assembly.
Figure 4:
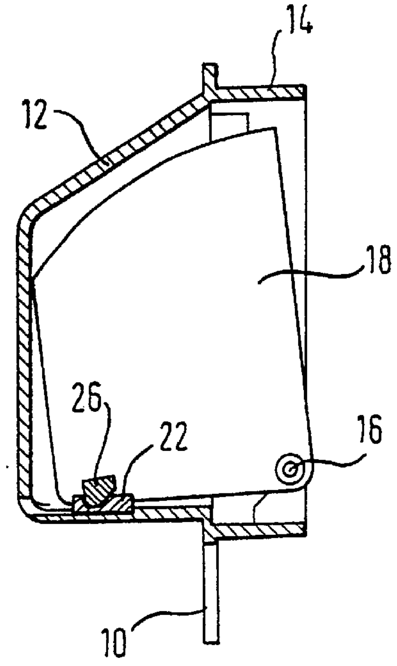
FIG. 4 is a similar view but showing the case in a pushed position beyond the closed position.

On the bottom of the housing shell 12, an internal groove is formed in which a blocking body 22 is slidingly guided. The blocking body 22 is biased into a normal inactive position shown in FIG. 3 by a return spring 23 (FIG. 2). On the surface facing the case 18, the blocking body 22 is provided with a notch 24 that lies across from a nose-like projection 26 on the bottom of the case 18. When the case 18 is pivoted out of the closed position shown in FIG. 3 into the pushed position shown in FIG. 4, then the projection 26 enters the notch 24 of the blocking body 22. In the embodiment shown, the case 18 is pivoted by an angle of about 7° from the closed position to the pushed position.

Figure 5:
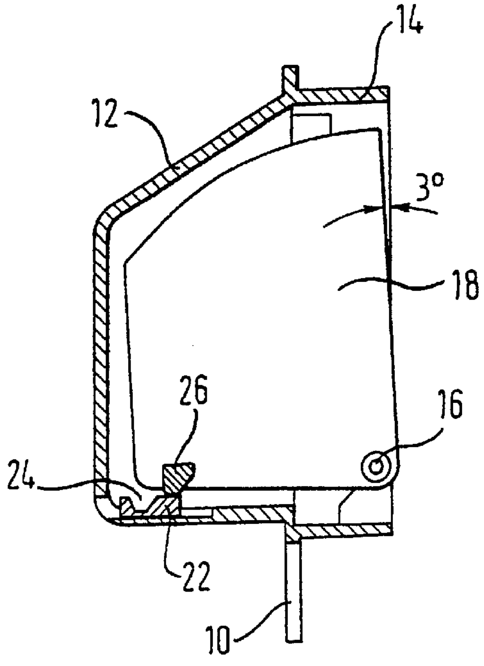
FIG. 5 is a sectional view of the assembly showing the case blocked in the closed position.

When an impact acts upon the ashtray assembly, for example, when a vehicle door is slammed in which the assembly is installed, then the blocking body 22 is displaced under the effect of inertial forces into a deflected active position shown in FIG. 5. In this position of the blocking body 22, the notch 24 is no more aligned with the projection 26 and the projection now strikes the blocking body when the case 18 attempts to pivot towards the pushed position due to inertial forces. As a result of the blocking body 22 being in the active position, the pivotal movement of the case 18 is limited to a small angle of, for example, 3°, so that the pushed position required for unlatching is not reached. Therefore, the case 18 remains in its closed position.

What is claimed is:

1. A receptacle assembly including a housing shell, a case that is pivotally mounted in the shell to be movable between an open position and a closed position, a spring biasing the case to the open position and a latching mechanism for latching the case in the closed position, the latching mechanism releasing the case from the closed position under the action of a push onto the case against the force of the spring moving the case to a pushed position, and further comprising a blocking device with a blocking body that is spring biased to a normal rest position and movable under inertial forces to an active blocking position, the blocking body in the normal rest position permitting free pivotal movement of the case and, in the blocking position, blocking movement of the case from the closed to the pushed position, wherein the blocking device includes an engagement member attached to one of the case and the housing shell, the blocking body being movably mounted on the other of said case and housing shell, the blocking body having a shaped structure and the engagement member also having a shaped structure, said shaped structures fitting into each other when the blocking member is in said normal rest position and the case is in the pushed position, and the engagement member abutting the blocking body when the blocking body is in said active blocking position and the case moves from the closed position towards the pushed position.

2. The assembly according to claim 1 wherein the shaped structure of the locking body is a notch.

* * * * *